United States Patent
Kawamura et al.

(10) Patent No.: US 9,714,004 B2
(45) Date of Patent: Jul. 25, 2017

(54) ELECTRONIC KEY REGISTRATION SYSTEM

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Daisuke Kawamura, Aichi (JP); Masahiro Arakawa, Aichi (JP); Masaki Hayashi, Aichi (JP); Hiroaki Iwashita, Aichi (JP); Tetsuya Egawa, Aichi (JP); Kazunori Arakawa, Aichi (JP); Ryuta Atsumi, Toyota (JP); Chihiro Tatebayashi, Nagoya (JP)

(73) Assignees: KABUSHIKI KAISHA TOKAI RIKA DENKI SEISAKUSHO, Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 5 days.

(21) Appl. No.: 15/009,079

(22) Filed: Jan. 28, 2016

(65) Prior Publication Data
US 2016/0225207 A1    Aug. 4, 2016

(30) Foreign Application Priority Data

Feb. 2, 2015   (JP) .................................. 2015-018470
Nov. 24, 2015  (JP) .................................. 2015-228940

(51) Int. Cl.
*B60R 25/24* (2013.01)
*G07C 9/00* (2006.01)
(Continued)

(52) U.S. Cl.
CPC .............. *B60R 25/24* (2013.01); *G06F 21/35* (2013.01); *G06F 21/629* (2013.01);
(Continued)

(58) Field of Classification Search
CPC ............ G07C 9/00007; G07C 9/00015; G07C 9/00103; G07C 9/00817; B60R 25/24; B60R 2001/1284
See application file for complete search history.

(56) References Cited

U.S. PATENT DOCUMENTS 5,892,900 A * 4/1999 Ginter ..................... G06F 21/10
                                                                726/26
6,160,488 A    12/2000 Honda
(Continued)

FOREIGN PATENT DOCUMENTS

EP    2767446    8/2014
EP    2767956    8/2014
(Continued)

OTHER PUBLICATIONS

Extended European Search Report from European Patent Office (EPO) in European Patent Appl. No. 16153093.6, dated Jun. 3, 2016.

*Primary Examiner* — Thomas Alunkal
(74) *Attorney, Agent, or Firm* — Greenblum & Bernstein, P.L.C.

(57) ABSTRACT

An electronic key registration system includes an electronic key and a communication master. The electronic key transmits a registration code. The communication master receives the registration code from the electronic key, obtains key information using the registration code, and registers the key information. The registration code is set in accordance with the communication master to which the electronic key is registered. The communication master includes a level determination unit, which determines a key registration security level when the electronic key is registered to the communication master, and a registration execution unit, which obtains the key information using the registration
(Continued)

code based on the determined key registration security level and registers the key information to the communication master.

9 Claims, 6 Drawing Sheets

(51) Int. Cl.
*H04L 9/08* (2006.01)
*H04L 9/32* (2006.01)
*H04L 29/06* (2006.01)
*G06F 21/35* (2013.01)
*G06F 21/62* (2013.01)

(52) U.S. Cl.
CPC ..... *G07C 9/00103* (2013.01); *G07C 9/00817* (2013.01); *H04L 9/0816* (2013.01); *H04L 9/0869* (2013.01); *H04L 9/3271* (2013.01); *H04L 63/061* (2013.01); *H04L 2209/80* (2013.01); *H04L 2209/84* (2013.01)

(56) References Cited

U.S. PATENT DOCUMENTS

| | | | |
|---|---|---|---|
| 9,020,147 B2 | 4/2015 | Kawamura et al. | |
| 9,070,279 B2 | 6/2015 | Shimizu et al. | |
| 9,094,382 B2 | 7/2015 | Kawamura et al. | |
| 9,137,658 B2 | 9/2015 | Kawamura et al. | |
| 9,143,320 B2 | 9/2015 | Kawamura et al. | |
| 9,306,735 B2 | 4/2016 | Kawamura et al. | |
| 9,330,510 B2 | 5/2016 | Kawamura et al. | |
| 2003/0090154 A1* | 5/2003 | Takezaki ................ B60R 25/04 307/10.2 |
| 2004/0056776 A1 | 3/2004 | Tsuji et al. | |
| 2006/0019720 A1* | 1/2006 | Kakehi ................ H04M 1/6091 455/569.2 |
| 2006/0082437 A1* | 4/2006 | Yuhara ................ B60R 25/04 340/5.82 |
| 2008/0154774 A1* | 6/2008 | Dennison ............ H04L 63/083 705/51 |
| 2010/0073130 A1* | 3/2010 | Tsuruta ................ B60R 25/24 340/5.8 |
| 2010/0220857 A1* | 9/2010 | Kawamura ........... H04L 9/0844 380/44 |
| 2011/0246707 A1* | 10/2011 | Ito ....................... G06F 12/1466 711/103 |
| 2012/0137137 A1 | 5/2012 | Brickell et al. | |
| 2013/0301829 A1* | 11/2013 | Kawamura ........... H04L 9/0816 380/44 |
| 2013/0301834 A1 | 11/2013 | Kawamura et al. | |
| 2013/0329890 A1* | 12/2013 | Kawamura ........ G07C 9/00174 380/281 |
| 2014/0089659 A1 | 3/2014 | Brickell et al. | |
| 2014/0098959 A1 | 4/2014 | Kawamura et al. | |
| 2014/0232520 A1 | 8/2014 | Kawamura et al. | |
| 2014/0232521 A1 | 8/2014 | Kawamura et al. | |
| 2014/0355761 A1 | 12/2014 | Kawamura et al. | |
| 2014/0359292 A1 | 12/2014 | Kawamura et al. | |
| 2015/0003613 A1 | 1/2015 | Kawamura et al. | |
| 2015/0010145 A1 | 1/2015 | Iwashita et al. | |

FOREIGN PATENT DOCUMENTS

| | | |
|---|---|---|
| JP | 7-61328 | 3/1995 |
| JP | 2003-148018 | 5/2003 |
| JP | 2004-107959 | 4/2004 |
| JP | 2011-020475 | 2/2011 |
| JP | 2013-055420 | 3/2013 |
| WO | 2012/074720 | 6/2012 |

* cited by examiner

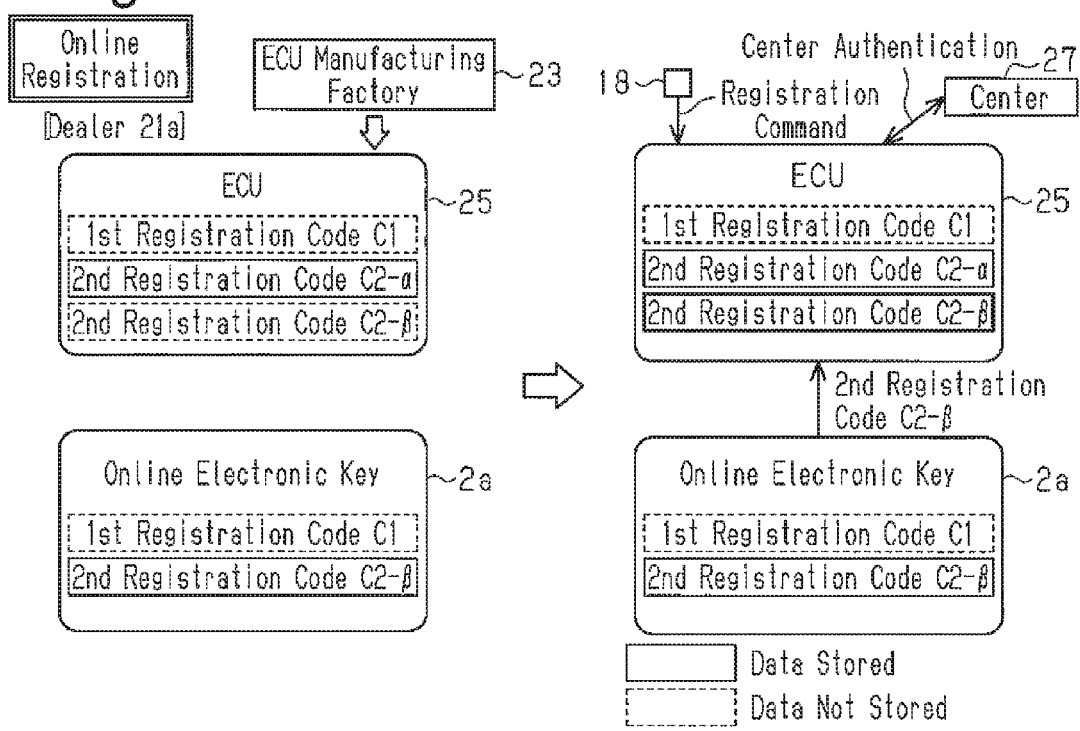
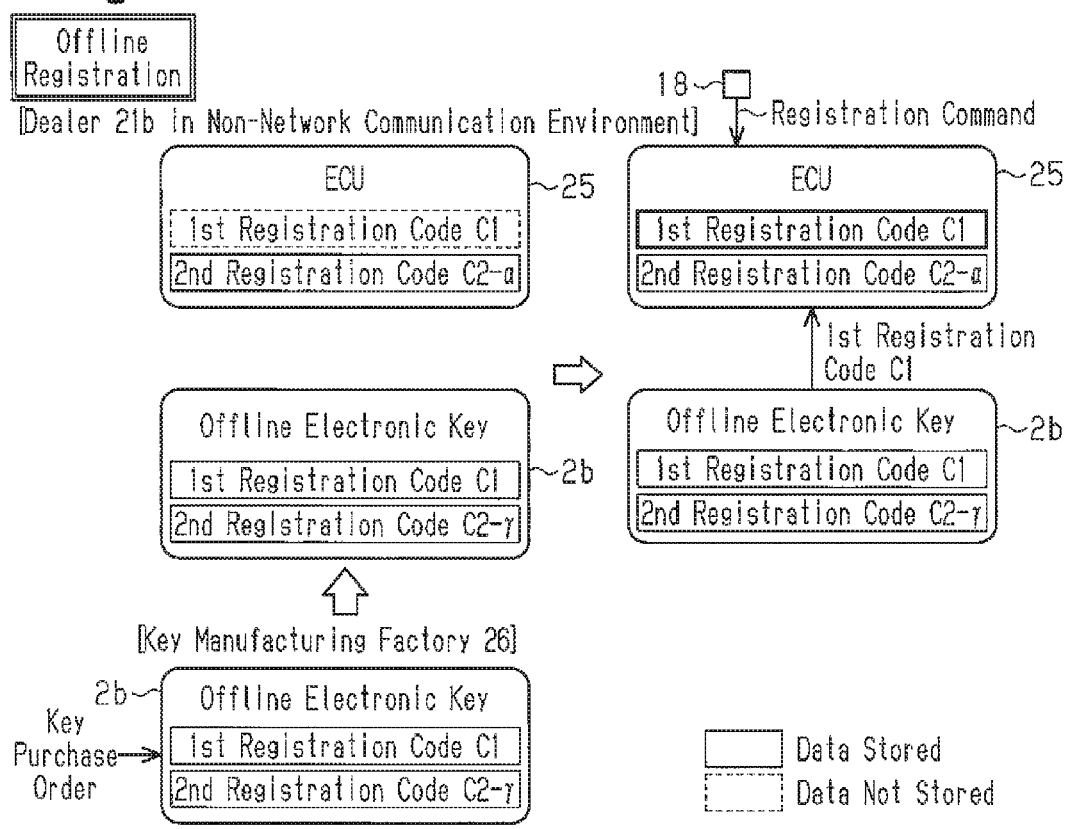

ELECTRONIC KEY REGISTRATION SYSTEM

CROSS-REFERENCE TO RELATED APPLICATIONS

This application is based upon and claims the benefit of priority from prior Japanese Patent Application No. 2015-018470, filed on Feb. 2, 2015, and prior Japanese Patent Application No. 2015-228940, filed on Nov. 24, 2015, the entire contents of which are incorporated herein by reference.

BACKGROUND ART

The present invention relates to an electronic key registration system that registers an electronic key to a communication master, which is a communication subject of the electronic key.

Electronic key systems are often installed in vehicles to perform key verification with a key ID transmitted from an electronic key through wireless communication. To register the electronic key used in such type of an electronic key system to a vehicle, a key ID or an encryption code of the electronic key is registered in advance to a controller that manages the operation of the electronic key system in the vehicle, such as an electronic control unit (ECU). Japanese Laid-Open Patent Publication Nos. 7-61328, 2003-148018, and 2004-107959 describe examples of the electronic key registration system.

An electronic key system may register an electronic key to a random ECU and a specific ECU that have different authentication levels.

SUMMARY OF THE INVENTION

One aspect of the present invention is an electronic key registration system including an electronic key and a communication master. The electronic key transmits at least one registration code. The communication master receives the at least one registration code from the electronic key, obtains key information using the at least one registration code that has been received, and registers the obtained key information. The at least one registration code is set in accordance with the communication master to which the electronic key is registered. The communication master includes a level determination unit and a registration execution unit. The level determination unit determines a key registration security level when the electronic key is registered to the communication master. The registration execution unit obtains the key information using the at least one registration code based on the determined key registration security level and registers the obtained key information to the communication master.

A further aspect of the present invention is a controller of a communication master. The controller is capable of communicating with an electronic key. The controller includes a command configured to obtain at least one registration code set in accordance with the communication master to which the electronic key is registered, a command configured to determine a key registration security level when the electronic key is registered to the communication master, and a command configured to obtain key information using the at least one registration code based on the determined key registration security level and register the key information to the communication master.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a diagram illustrating online registration;

FIG. 3 is a diagram illustrating offline registration;

DETAILED DESCRIPTION OF THE EMBODIMENTS

First Embodiment

A first embodiment of an electronic key registration system will now be described with reference to FIGS. 1 to 6.

Electronic Key System

Figure 1:
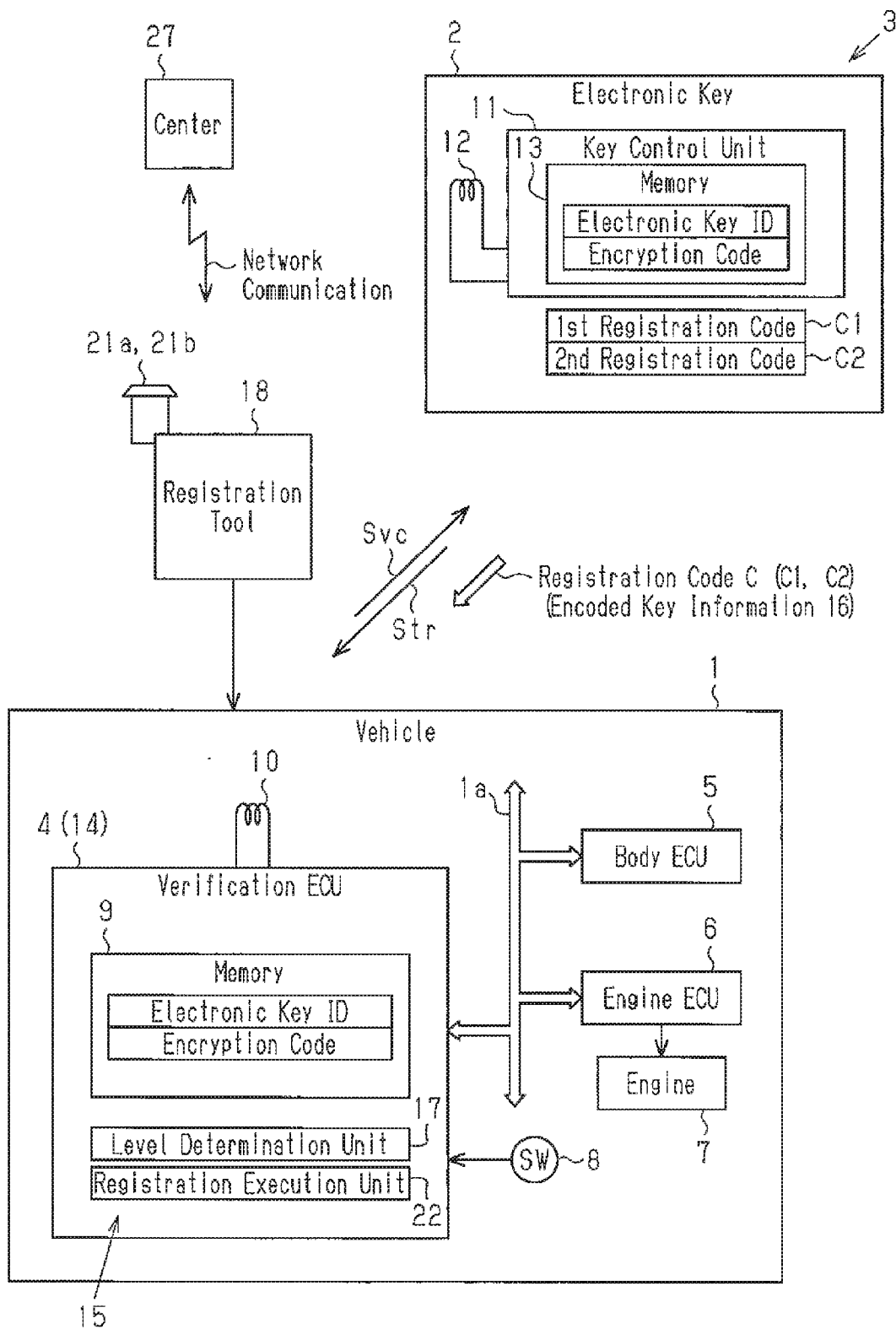
FIG. 1 is a diagram illustrating the configuration of an electronic key registration system in a first embodiment.

As shown in FIG. 1, a vehicle 1 includes an electronic key system 3 that determines the authenticity of an electronic key 2 through wireless communication. The electronic key system 3 performs, for example, narrow-field wireless communication having an extremely narrow communication range (communication distance of a few centimeters to several tens of centimeters). Narrow-field communication includes, for example, radio frequency identification (RFID) and near field communication (NFC). The ID authentication performed with narrow-field wireless communication will hereinafter be referred to as "immobilizer authentication," and the narrow-field communication will hereinafter be referred to as "immobilizer communication."

The vehicle 1 includes a verification ECU 4, which authenticates the electronic key 2, a body ECU 5, which manages the power for on-vehicle electric devices, and an engine ECU 6, which controls an engine 7. A communication line 1a connects the ECUs 4 to 6 in the vehicle 1. The communication line 1a is configured in compliance with a standard such as Controller Area Network (CAN) and Local Interconnect Network (LIN). The verification ECU 4 includes a memory 9 that stores at least one electronic key ID, which is used for ID authentication in narrow-field wireless communication, and at least one encryption code, which is used for challenge-response authentication during the ID authentication. For example, the number of the electronic key IDs and the number of the encryption codes is based on the number of keys registered to the vehicle 1. The vehicle 1 includes a communication antenna 10 that allows radio waves to be transmitted and received in narrow-field wireless communication. The communication antenna 10 is connected to the verification ECU 4 and located, for example, near the driver seat in the passenger compartment. The communication antenna 10 is capable of transmitting and receiving radio waves in, for example, the low frequency (LF) band.

The electronic key 2 includes a key control unit 11, which controls the operation of the electronic key 2, and a communication antenna 12 that allows radio waves to be transmitted and received in narrow-field wireless communication. The key control unit 11 includes a memory 13 that stores an electronic key ID and an encryption code. The communication antenna 12 is capable of transmitting and receiving LF radio waves.

When a user enters the vehicle 1, the verification ECU 4 transmits a drive radio wave Svc in the LF band from the communication antenna 10. The drive radio wave Svc includes a non-modulation wave, which powers the electronic key 2, and a challenge code, which has a value that changes whenever communication is performed. When the electronic key 2 is held near the communication antenna 10 and the drive radio wave Svc is received by the communication antenna 12, the electronic key 2 generates power from the drive radio wave Svc and uses the power to return a transponder signal Str in the LF band. The transponder signal Str includes the electronic key ID registered to the electronic key 2 and a response code, which is generated based on a challenge code received from the vehicle 1 and the encryption code of the electronic key 2.

When the communication antenna 10 receives the transponder signal Str from the electronic key 2, the verification ECU 4 performs challenge-response authentication by comparing the response code in the transponder signal Str with a response code calculated in the same manner as the electronic key 2. Further, the verification ECU 4 performs electronic key ID authentication by comparing the electronic key ID in the transponder signal Str with the electronic key ID registered to the verification ECU 4. When the two authentications are both successful, the verification ECU 4 determines that immobilizer authentication has succeeded and permits power switching (engine starting) with an engine switch 8.

Electronic Key Registration System

As shown in FIG. 1, the vehicle 1 includes an electronic key registration system 15, which is used when registering the electronic key 2 to a communication master 14 (in one example, the verification ECU 4). The electronic key registration system 15 transmits a registration code C, which is obtained by encoding key information 16, from the electronic key 2 to the communication master 14. Further, the electronic key registration system 15 decodes the registration code C in the communication master 14 to generate the key information 16. Then, the electronic key registration system 15 registers the key information 16 to the communication master 14. In this manner, the electronic key registration system 15 registers the electronic key 2 to the communication master 14. One example of the communication master 14 is the verification ECU 4, which functions as a controller. Preferably, the key information 16 is, for example, an electronic key ID or an encryption code.

The electronic key registration system 15 includes at least one registration code C provided in accordance with the location where the communication master 14 performs key registration. The electronic key registration system 15 uses the, at least one registration code C to perform key registration. The registration code C of the present example is a key information generation code, which is the origin of the key information 16. Further, the registration code C of the present example includes a first registration code C1 and a second registration code C2, which are selected in accordance with the key registration (registration command) security level. In the present example, the first registration code C1 and the second registration code C2 are both key information generation codes.

The first registration code C1 enables the registration of the electronic key 2 to only a specific communication master 14 and is thus used when the security level of the registration environment is low. That is, security is ensured by limiting the communication master 14 (ECU) that can be used. Thus, the first registration code C1 is used when the security level of the registration environment is low, that is, when the communication master 14 performs key registration at a location where the security level is low. In other words, the first registration code C1 has an encryption level that corresponds to a registration environment having a low security level. For example, the first registration code C1 is encrypted in a complicated manner so that it can be used in a registration environment having a low security level. The second registration code C2 enables the registration of the electronic key 2 to a random communication master 14 and is thus used when the security level of the registration environment is high. That is, there is no limit to the communication master 14 (ECU) that can be used. Thus, the second registration code C2 is used when the registration security level is higher than that of the first registration code C1, that is, when the communication master 14 performs key registration at a location where the security level is high. In other words, the second registration code C2 has an encryption level that corresponds to a registration environment having a high security level. For example, the second registration code C2 is encrypted in a simpler manner than the first registration code C1 since it is used in a registration environment having a high security level. In this manner, the location where the communication master 14 performs registration determines whether a random electronic key 2 or a specific electronic key 2 can be registered. The electronic key registration system 15 includes at least one registration code C provided in accordance with whether the key registration location of the communication master 14 enables the registration of a random electronic key 2 or a specific electronic key 2. In other examples, the electronic key registration system 15 may include at least one registration code C that is provided in accordance with the key registration location limitation degree, type, function, usage, or confidentiality of the communication master 14.

In the present example, key registration refers to "online registration" and "offline registration." Online registration refers to, for example, a registration environment in which key registration is performed using network communication under an environment in which network communication can be performed. Offline registration refers to, for example, a registration environment in which key registration is performed without using network communication under an environment in which network communication cannot be performed.

The electronic key registration system 15 includes a level determination unit 17 that determines the security level when registering the electronic key 2 to the communication master 14. The level determination unit 17 is included in, for example, the verification ECU 4. The level determination unit 17 determines the key registration security level based on a "registration command" received from, for example, a registration tool 18. The registration command instructs the communication master 14 of the type of key registration that is to be performed. When the level determination unit 17 receives, for example, an "online registration command" from the registration tool 18, the level determination unit 17 determines that the key registration security level is high. When the level determination unit 17 receives, for example, an "offline registration command" from the registration tool 18, the level determination unit 17 determines that the key registration security level is low.

The electronic key registration system 15 includes a registration execution unit 22 that executes key registration based on the determination result of the level determination unit 17. The registration execution unit 22 performs key registration using the registration code C corresponding to the key registration security level of the communication master 14 at the key registration location.

The operation of the electronic key registration system 15 will now be described with reference to FIGS. 2 to 6.

Online Registration

FIG. 2 illustrates online registration. Online registration refers to key registration that requires authentication by a center 27. For example, a car dealer 21*a*, which has an environment that allows for network communication, is provided with an ECU 25, which is manufactured in an ECU manufacturing factory 23, and an online electronic key 2*a*, which stores a second registration code C2-β. In FIG. 2, the second registration code C2-α has been registered to the ECU 25. However, there may be no code registered to the ECU 25.

The online electronic key 2*a* is registered to the ECU 25 through online registration at the dealer 21*a* via the center 27 using the registration tool 18. In this case, the registration tool 18 provides the ECU 25 with a registration command (online registration command) to start online registration. Then, the center checks the authenticity of the ECU 25 (center authentication), which is the registration subject, and permits key registration when the authentication is successful. Preferably, the registration tool 18 used for online registration is a commercially available tool located in the dealer 21*a*. One example of a commercially available tool is a versatile computer, such as a personal computer or a smartphone, incorporating dedicated software.

Online registration requires center authentication and thus has a high key registration security level. Accordingly, online registration uses the second registration code C2-β for key registration. That is, the second registration code C2-β enables a random key to be registered to a random ECU and is thus used under a registration environment that ensures a high security level.

Offline Registration

FIG. 3 illustrates offline registration. Offline registration refers to key registration that does not require authentication by the center 27. A key manufacturing factory 26 manufactures an offline electronic key 2*b* that can be used for offline registration. The offline electronic key 2*b* is a made-to-order key manufactured for the ECU 25. Further, the offline electronic key 2*b* stores a second registration code C2-γ in addition to the first registration code C1.

For example, a car dealer 21*b*, which does not have an environment that allows for network communication, is provided with an ECU 25, which is manufactured in the ECU manufacturing factory 23, and a made-to-order offline electronic key 2*b*. The ECU 25 used for offline registration is a "specific ECU" to which only a certain electronic key 2 can be registered. In FIG. 3, the second registration code C2-α has been registered to the ECU 25. However, there may be no code registered to the ECU 25.

The offline electronic key 2*b* is registered to the ECU 25 through offline registration at the dealer 21*b* using the registration tool 18. In this case, the registration tool 18 provides the ECU 25 with a registration command (offline registration command) to start offline registration. The first registration code C1, which is registered to the offline electronic ley 2*b*, is used to register the offline electronic key 2*b* to the ECU 25. Preferably, the registration tool 18 used for offline registration is a commercially available tool located in the dealer 21*a*.

Offline registration does not require center authentication and thus has a low key registration security level. Accordingly, offline registration uses the first registration code C1 for key registration. That is, the first registration code C1 enables registration to only a specific ECU and is thus used under a registration environment having a low security level. The first registration code C1 ensures security by limiting the ECU that can be used. Thus, it is difficult for someone to obtain the first registration code. For example, the security level is low during offline registration (key registration performed without network communication).

Figure 4:
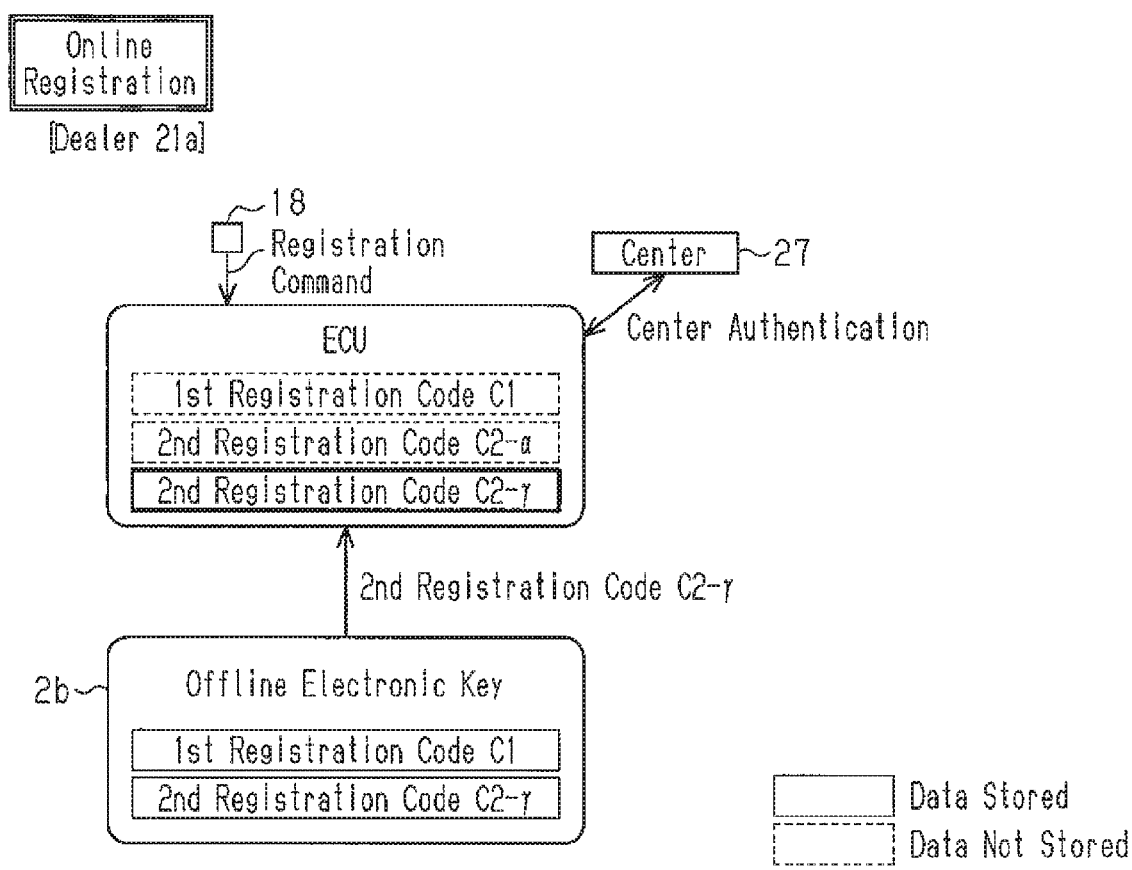
FIG. 4 is a diagram illustrating online registration of an offline electronic key to a vehicle.

Referring to FIG. 4, the first registration code C1 and the second registration code C2-γ are both written to the offline electronic key 2*b* of the present example. This allows for registration to the ECU 25 through online registration in addition to offline registration. Thus, when only the offline electronic key 2*b* is available even though online registration can be performed, the offline electronic key 2*b* can be registered offline to the ECU 25.

Additional Registration (Online Registration)

Figure 5:
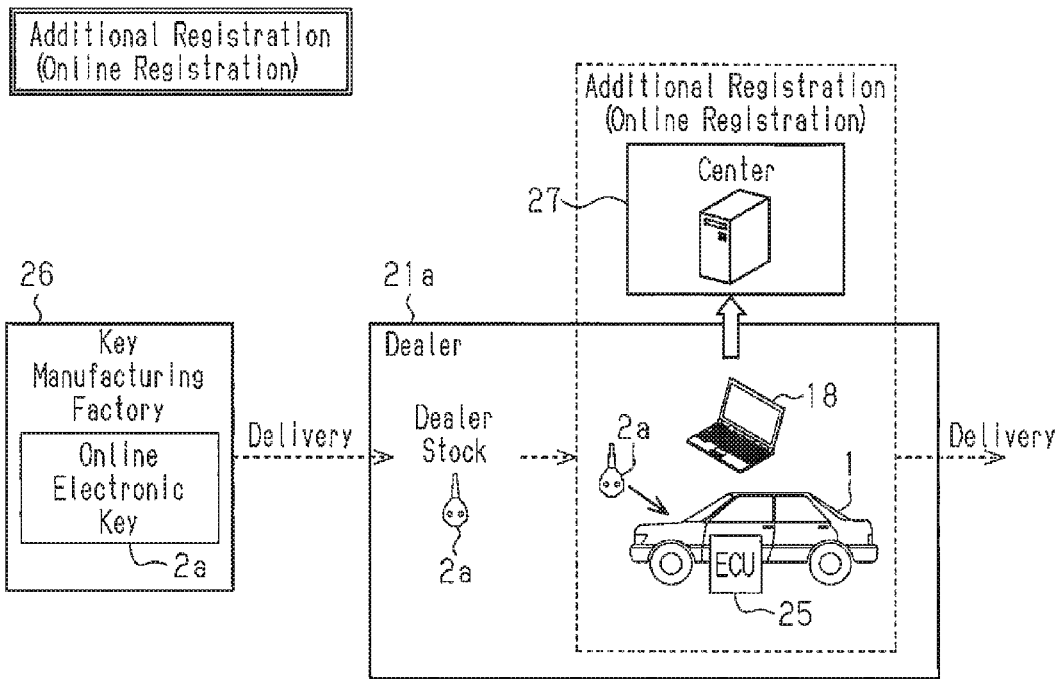
FIG. 5 is a diagram illustrating the service procedures for additional registration (online registration)

FIG. 5 illustrates the service procedures for additional registration (online registration). A situation in which an additional registration (online registration) is performed is when an electronic key 2 that can be used is added under a center-accessible environment.

For additional registration (online registration), the key manufacturing factory 26 manufactures the online electronic key 2*a* and delivers the online electronic key 2*a* to the dealer 21*a*. When the dealer 21*a* receives an order for additional key registration from a user, the dealer 21*a* registers the online electronic key 2*a*, which is in stock or has been delivered from the key manufacturing factory 26, to the ECU 25 with the registration tool 18. The ECU 25 is an on-vehicle ECU. Then, the dealer 21*a* delivers the vehicle 1 to the user. In this case, the registration tool performs center authentication when executing key registration.

The procedures for additional registration (online registration) include providing an additional online registration command to the ECU 25 from the registration tool 18 and checking whether or not the ECU 25 (registration execution unit 22) includes a registered electronic key. Preferably, the checking of whether or not a registered electronic key is included is a process for checking whether or not an encryption code is written to the memory 9 of the ECU 25.

Additional Registration (Offline Registration)

Figure 6:
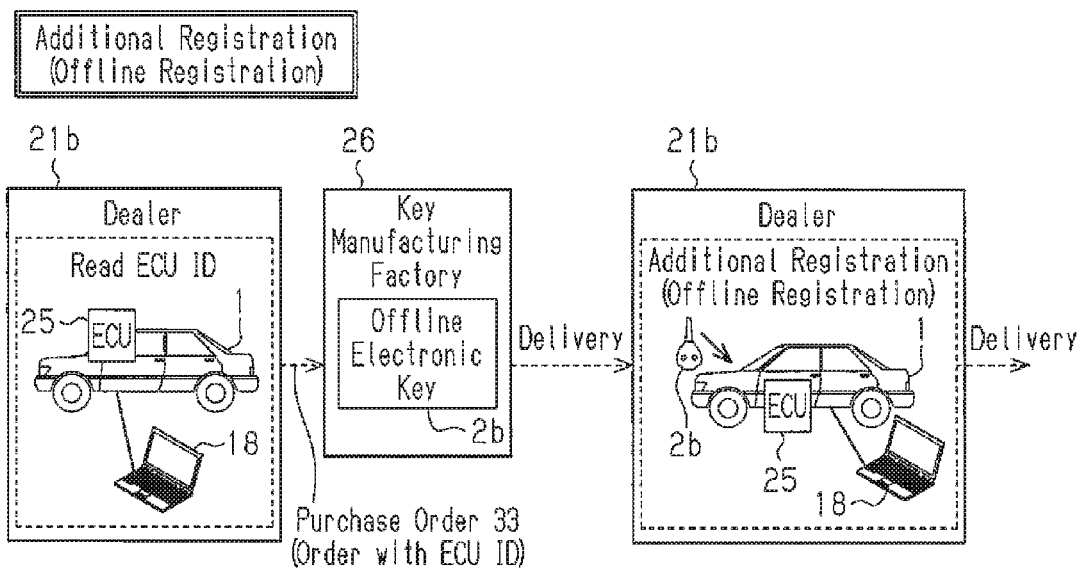
FIG. 6 is a diagram illustrating the service procedures for additional registration (offline registration)

FIG. 6 illustrates the service procedures for additional registration (offline registration). A situation in which an additional registration (offline registration) is performed is when an electronic key 2 that can be used is added under a non-center-accessible environment.

For additional registration (offline registration), when the dealer 21*b* receives an order for additional key registration from a user, the dealer 21*b* reads an ECU ID from the ECU 25. Then, the dealer 21*b* submits a purchase order 33 to the key manufacturing factory 26 to order a key that corresponds to the ECU ID. The key manufacturing factory 26 manufactures the offline electronic key 2*b* in accordance with the received purchase order 33 and delivers the offline electronic key 2b to the dealer 21b. Then, the dealer 21b registers the offline electronic key 2b, which has been delivered from the key manufacturing factory 26, to the ECU 25 with the registration tool 18 and delivers the vehicle 1 to the user.

The procedures for additional registration (offline registration) include providing an additional offline registration command to the ECU 25 from the registration tool 18 and checking whether or not the ECU 25 (registration execution unit 22) includes a registered electronic key. Preferably, the checking of whether or not a registered electronic key is included is a process for checking whether or not an encryption code is written to the memory 9 of the ECU 25.

The present embodiment has the advantages described below.

(1) Two registration codes C (first registration code C1 and second registration code C2) are prepared for the electronic key 2. When registering the electronic key 2 to the vehicle 1 (ECU 25), the code that is used is selected from the two registration codes C in accordance with the security level required for key registration. This avoids situations in which the level of security is too high or too low. Thus, key registration is performed with security set at an optimal level.

(2) Key registration is performed with security set at an optimal level when registering the electronic key 2 to a random ECU 25 and when registering the electronic key 2 to a specific ECU 25.

(3) The first registration code C1 and the second registration code C2 are both written to the electronic key 2 (offline electronic key 2b). The first registration code C1 is used when registering the electronic key 2 to the vehicle 1 through online registration. The second registration code C2 is used when registering the electronic key 2 to the vehicle 1 through offline registration. In this manner, the electronic key 2 can be registered offline and online to the vehicle 1. This improves the convenience for key registration.

(4) The registration code C is a key information registration code. Thus, the key information 16 cannot be generated unless the correct registration code C is obtained. This ensures security against copying of the key information 16.

(5) The procedures of key registration differ between online registration and offline registration. This is advantageous for obtaining optimal key registration security.

Second Embodiment

A second embodiment will now be described with reference to FIG. 7. The second embodiment differs from the first embodiment in the offline registration procedures. Like or same reference numerals are given to those components that are the same as the corresponding components of the first embodiment. The description hereafter will focus on the differing points. In the present example, online registration is the same as that of the first embodiment. Thus, only offline registration will be described.

Figure 7:
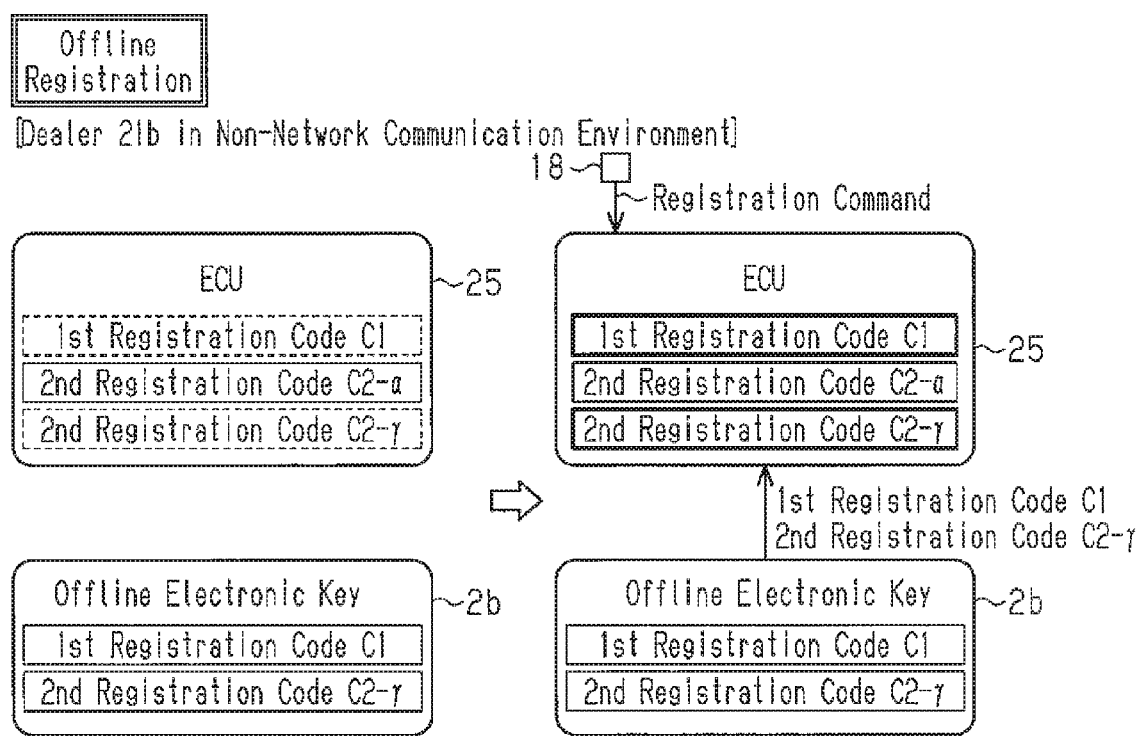
FIG. 7 is a diagram illustrating the configuration of an electronic key registration system in a second embodiment.

Referring to FIG. 7, the first registration code C1 is stored in the offline electronic key 2b as a check code to check whether or not the key information 16 (encryption code in present example) can be generated. Further, the second generation code C2-γ is stored in the offline electronic key 2b as a key information generation code that is the origin of the key information 16 (encryption code in present example).

When the dealer 21b registers the offline electronic key 2b offline to the ECU 25, the ECU 25 receives the first registration code C1 and the second registration code C2-γ from the offline electronic key 2b. Preferably, the ECU 25 uses hardware of the electronic key system 3 to obtain the first registration code C1 and the second registration code C2-γ.

The ECU 25 (registration execution unit 22) uses the first registration code C1 obtained from the offline electronic key 2b to determine whether or not the key information (encryption code in present example) can be registered to the ECU 25. In the present example, the ECU 25 compares the first registration code C1, which is obtained from the offline electronic key 2b, with a value obtained by the ECU 25 to determine whether or not to perform registration. When the first registration code C1 matches the value obtained by the ECU 25, registration of the key information 16 is permitted.

When the ECU 25 (registration execution unit 22) checks with the first registration code C1 that registration can be performed, the ECU 25 generates the key information (encryption code in present example) and registers the key information 16 to the memory 13. In the present example, the second registration code C2-γ is used to generate the key information 16. This completes the registration of the key information 16.

In addition to advantages (1) to (5) of the first embodiment, the present embodiment has the following advantage.

(6) During offline registration, the first registration code C1 is used to determine whether or not to perform key registration. This is advantageous for ensuring key registration security.

Third Embodiment

A third embodiment will now be described with reference to FIGS. 8 and 9. In the description hereafter, parts differing from the first and second embodiments will be described in detail.

Figure 8:
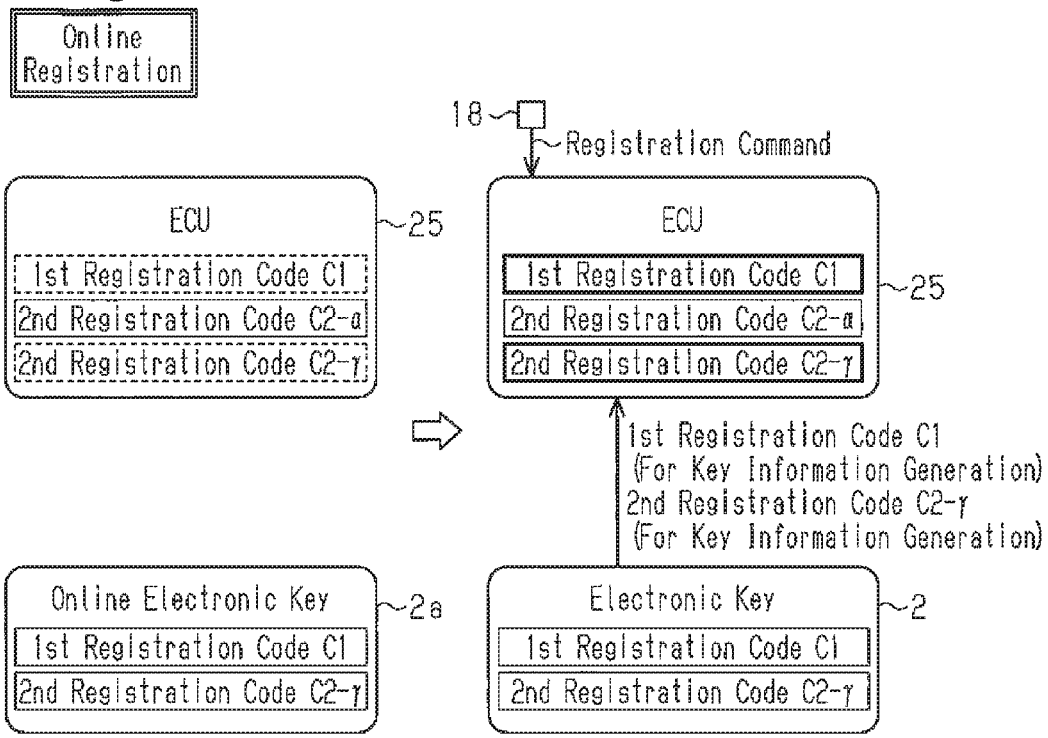
FIG. 8 is a diagram illustrating the configuration of online registration performed by an electronic key registration system in a third embodiment.

Referring to FIG. 8, the first registration code C1 is used as a key information generation code in the online electronic key 2a. Further, the second registration code C2-γ is used as a key information generation code in the online electronic key 2a.

When the electronic key 2 is registered online to the ECU 25, the ECU 25 receives the first registration code C1 and the second registration code C2-γ from the electronic key 2. Online registration requires center authentication in the same manner as the first and second embodiments.

When the ECU 25 (registration execution unit 22) receives the first registration code C1 and the second registration code C2-γ from the online electronic key 2a, the ECU 25 uses both of the registration code C1 and the second registration code C2-γ to generate the key information 16 (encryption code in present example) and registers the key information 16 to the memory 13. That is, the online registration of the present example uses the registration code C1 and the second registration code C2-γ to generate the key information 16. This completes registration of the key information 16.

Figure 9:
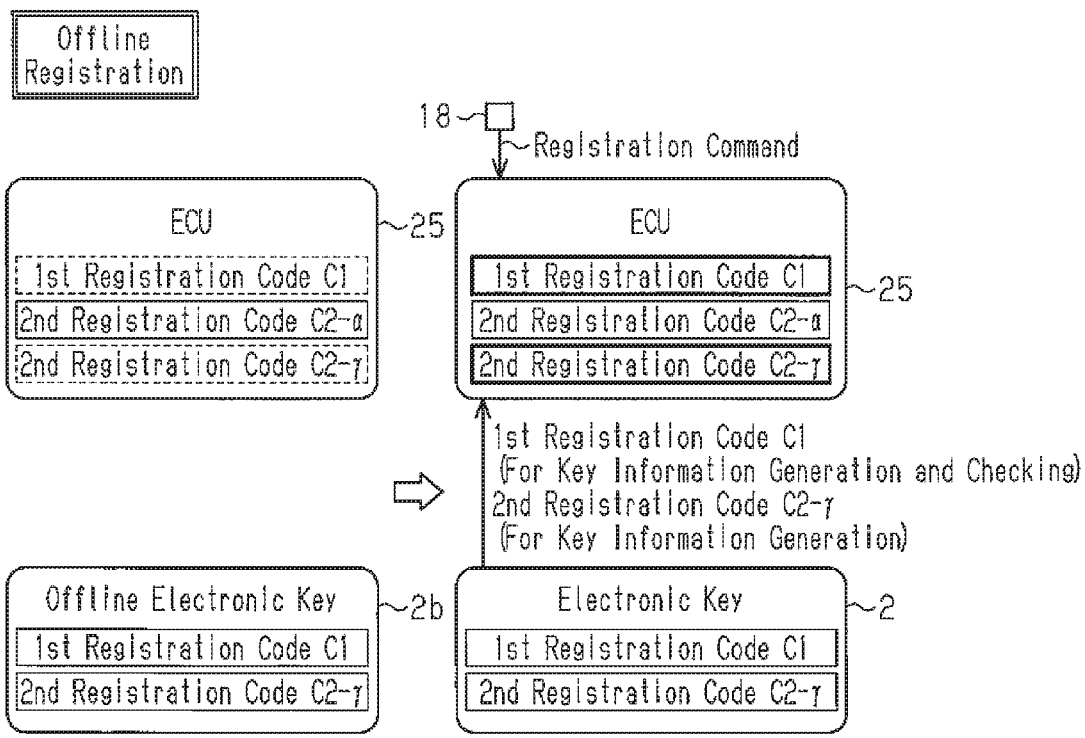
FIG. 9 is a diagram illustrating the configuration of offline registration performed by the electronic key registration system.

Referring to FIG. 9, the first registration code C1 is stored in the offline electronic key 2b as a key information generation code and a check code. Further, the second registration code C2-γ is stored in the offline electronic key 2b as a key information generation code.

When the electronic key 2 is registered offline to the ECU 25, the ECU 25 receives the first registration code C1 and the second registration code C2-γ from the electronic key 2. In this case, the ECU 25 (registration execution unit 22) uses the first registration code C1, which is obtained from the electronic key 2, to determine whether or not the key information 16 (encryption code in present example) can be registered to the ECU 25. In the present example, the ECU 25 compares the first registration code C1, which is obtained from the electronic key 2, with a value obtained by the ECU 25 to determine whether or not to perform registration. When the first registration code C1 matches the value obtained by the ECU 25, registration of the key information 16 is permitted.

When the ECU 25 (registration execution unit 22) checks with the first registration code C1 that registration can be performed, the ECU 25 generates the key information (encryption code in present example) and registers the key information 16 to the memory 13. In the offline registration of the present example, the first registration code C1 and the second registration code C2-γ are used to generate the key information 16. This completes the registration of the key information 16.

In addition to advantages (1) to (6) of the first and second embodiments, the present embodiment has the following advantage.

(7) The first registration code C1 and the second registration code C2-γ are both used to generate the encryption code. This is advantageous for generating the encryption code.

It should be apparent to those skilled in the art that the present invention may be embodied in many other specific forms without departing from the spirit or scope of the invention. Particularly, it should be understood that the present invention may be embodied in the following forms.

In each of the above embodiments, the communication master 14 may be configured by one or more ECUs.

In each of the above embodiments, the electronic key system 3 may be a smart communication system in which the vehicle 1 and the electronic key 2 perform ID verification (smart verification) through narrow area communication. Further, hardware of the smart communication system may be used when registering an immobilizer key.

In each of the above embodiments, the determination of the key registration security level is not limited to the process that receives a registration command from the registration tool 18 (commercially available tool). For example, a flag indicating the security level content may be set to the ECU 25, and the flag may be used to perform level determination.

In each of the above embodiment, center authentication only needs to check the authenticity of the communication master 14 and the electronic key 2 through the center 27. Further, center authentication does not have to be performed using the center 27 as a master. For example, the communication master 14 may function as an authentication master that checks the authenticity of the center 27.

In each of the above embodiments, the key information 16 may be any kind of data or information as long as it is an item registered to the communication master 14 during key registration.

In each of the above embodiments, the registration code C only needs to be encoded information required for key registration.

In each of the above embodiments, the communication master 14 is not limited to the ECU 25 (verification ECU 4) and may be any device that manages communication with the electronic key 2.

In each of the above embodiments, network communication is not limited to Internet communication and may be changed to any of various types of wide area communication.

In each of the above embodiments, the electronic key registration system 15 does not have to be installed in a vehicle and is applicable to various types of systems and devices.

In the electronic key registration system, key registration is performed using hardware of the electronic key system that is arranged between the communication master and the electronic key. In this configuration, hardware of the electronic key system is used to register the electronic key to the communication master. Thus, there is no need to add a separate component to perform key registration.

The present examples and embodiments are to be considered as illustrative and not restrictive, and the invention is not to be limited to the details given herein, but may be modified within the scope and equivalence of the appended claims.

The invention claimed is:

1. An electronic key registration system comprising:
    an electronic key that transmits at least one registration code; and
    a communication master that receives the at least one registration code from the electronic key, obtains key information using the at least one registration code that has been received, and registers the obtained key information, wherein
    the at least one registration code is set in accordance with the communication master to which the electronic key is registered, and
    the communication master includes
        a level determination unit that determines a key registration security level when the electronic key is registered to the communication master, and
        a registration execution unit that obtains the key information using the at least one registration code based on the determined key registration security level and registers the obtained key information to the communication master.

2. The electronic key registration system according to claim 1, wherein the at least one registration code includes, among a key information generation code that serves as an origin of the key information and a check code that is used to check whether or not the key information can be generated, at least the key information generation code.

3. The electronic key registration system according to claim 1, wherein the level determination unit determines the key registration security level in accordance with whether or not registration of a random electronic key to the communication master is enabled or whether or not registration of only a specific electronic key to the communication master is enabled.

4. The electronic key registration system according to claim 1, wherein:
    key registration includes
        online registration that registers the electronic key to the communication master through network communication, and
        offline registration that registers the electronic key to the communication master without using the network communication;
    the electronic key is either one of an offline registration electronic key and an online registration electronic key; and
    the level determination unit determines the key registration security level in accordance with whether the key registration is the online registration or the offline registration.

5. The electronic key registration system according to claim 4, wherein:
    the offline registration electronic key stores a first registration code and a second registration code that are used as a key information generation code;

the online registration electronic key stores a second registration code that is used as the key information generation code;

when the key registration is the offline registration, the registration execution unit obtains the first registration code from the offline registration electronic key, generates the key information from the first registration code, and registers the generated key information to the communication master;

when the key registration is the online registration and the electronic key is the online registration electronic key, the registration execution unit obtains the second registration code from the online registration electronic key, generates the key information from the second registration code, and registers the generated key information to the communication master; and when the key registration is the online registration and the electronic key is the offline registration electronic key, the registration execution unit obtains the second registration code from the offline registration electronic key, generates the key information from the second registration code, and registers the generated key information to the communication master.

6. The electronic key registration system according to claim 4, wherein:

the offline registration electronic key stores a first registration code that is used as a check code and a second registration code that is used as a key information generation code;

the online registration electronic key stores the second registration code that is used as the key information generation code;

when the key registration is the online registration and the electronic key is the online registration electronic key, the registration execution unit obtains the second registration code from the online registration electronic key, generates the key information from the second registration code, and registers the generated key information to the communication master; and when the key registration is the offline registration and the electronic key is the offline registration electronic key, the registration execution unit obtains the first registration code and the second registration code from the offline registration electronic key, checks with the first registration code whether or not key registration can be performed, generates the key information from the second registration code, and registers the generated key information to the communication master.

7. The electronic key registration system according to claim 4, wherein:

the offline registration electronic key stores a first registration code, which is used as a check code and a key information generation code, and a second registration code, which is used as the key information generation code;

the online registration electronic key stores the first registration code and the second registration code that are used as the key information generation code;

when the key registration is the online registration and the electronic key is the online registration electronic key, the registration execution unit obtains the first registration code and the second registration code from the online registration electronic key, generates the key information using both of the first registration code and the second registration code, and registers the generated key information to the communication master; and when the key registration is the offline registration and the electronic key is the offline registration electronic key, the registration execution unit obtains the first registration code and the second registration code from the offline registration electronic key, checks with the first registration code whether or not key registration can be performed, generates the key information using both of the first registration code and the second registration code, and registers the generated key information to the communication master.

8. A system capable of communicating with an electronic key, the system comprising:

an electronic controller to which the electronic key is registered; and an antenna configured to obtain at least one registration code set in accordance with the electronic controller to which the electronic key is registered, wherein the electronic controller is configured to determine a key registration security level when the electronic key is registered to the electronic controller; and the electronic controller is configured to obtain key information using the at least one registration code based on the determined key registration security level and register the key information to the electronic controller.

9. An electronic key registration system comprising:

an electronic key that transmits at least one registration code; and an electronic controller that receives the at least one registration code from the electronic key, obtains key information using the at least one registration code that has been received, and registers the obtained key information in a memory, wherein the at least one registration code is set in accordance with the electronic controller to which the electronic key is registered, the electronic controller determines a key registration security level when the electronic key is registered to the electronic controller, and the electronic controller obtains the key information using the at least one registration code based on the determined key registration security level and registers the obtained key information to the electronic controller.

* * * * *